United States Patent
Asthana et al.

(10) Patent No.: US 10,713,097 B2
(45) Date of Patent: Jul. 14, 2020

(54) AUTOMATIC GENERATION OF BLUEPRINTS FOR ORCHESTRATION ENGINES FROM DISCOVERED WORKLOAD REPRESENTATIONS

(71) Applicant: International Business Machines Corporation, Armonk, NY (US)

(72) Inventors: Neeraj Asthana, Acton, MA (US); Thomas Chefalas, Somers, NY (US); Alexei Karve, Mohegan Lake, NY (US); Matthew Staffelbach, White Plains, NY (US); Alla Segal, Mount Kisco, NY (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/150,446

(22) Filed: Oct. 3, 2018

(65) Prior Publication Data

US 2020/0110638 A1 Apr. 9, 2020

(51) Int. Cl.
*G06F 15/173* (2006.01)
*G06F 9/50* (2006.01)
(Continued)

(52) U.S. Cl.
CPC ........ *G06F 9/5077* (2013.01); *G06F 9/45533* (2013.01); *G06F 11/3404* (2013.01); *G06F 11/3414* (2013.01); *H04L 67/10* (2013.01)

(58) Field of Classification Search
CPC .............. G06F 9/5077; G06F 9/45533; G06F 11/3404; G06F 11/3414; H04L 67/10
(Continued)

(56) References Cited

U.S. PATENT DOCUMENTS 9,432,350 B2    8/2016 Anderson et al.
9,940,125 B1    4/2018 Espy et al.
(Continued)

OTHER PUBLICATIONS

Disclosed Anonymously, "A method for centrally managing data centers with container orchestration during continuous cloud operation", IP.com No. IPCOM000248894D, Publication Date: Jan. 20, 2017, 7 pages.
(Continued)

*Primary Examiner* — Philip B Tran
(74) *Attorney, Agent, or Firm* — Cantor Colburn LLP; Abdy Raissinia

(57) ABSTRACT

An aspect includes the automatic generation of blueprints for orchestration engines from discovered workload representations. A computer-implemented method includes receiving, using a processor, a description of a workload executing in a source computing environment. The description of the workload is mapped, using the processor, to one or more resource descriptors located in a repository of resource descriptors describing resources available in a target computing environment. A declarative representation of the workload in the target computing environment is generated, using the processor, based at least in part on the mapping and the description of the workload. The declarative representation includes a specification of resources required by the workload in the target environment.

20 Claims, 7 Drawing Sheets

(51) Int. Cl.
*G06F 9/455* (2018.01)
*G06F 11/34* (2006.01)
*H04L 29/08* (2006.01)

(58) Field of Classification Search
USPC .................................................. 709/226, 223
See application file for complete search history.

(56) References Cited

U.S. PATENT DOCUMENTS

| | | | | |
|---|---|---|---|---|
| 2011/0125894 | A1* | 5/2011 | Anderson | H04L 9/3213 709/224 |
| 2011/0154350 | A1* | 6/2011 | Doyle | G06F 9/5044 718/104 |
| 2011/0271270 | A1* | 11/2011 | Bowen | G06F 9/45558 717/171 |
| 2012/0066487 | A1* | 3/2012 | Brown | G06F 9/5083 713/150 |
| 2014/0237550 | A1* | 8/2014 | Anderson | H04L 9/3213 726/3 |
| 2014/0280961 | A1* | 9/2014 | Martinez | H04L 41/5054 709/226 |
| 2015/0026349 | A1 | 1/2015 | Iyoob | |
| 2016/0099888 | A1* | 4/2016 | Dunbar | H04L 67/1008 709/226 |
| 2018/0276060 | A1* | 9/2018 | Arumugam | G06F 9/547 |

OTHER PUBLICATIONS

Disclosed Anonymously, "Placement of Constrained Groups of Logical Application Components in a Cloud Computing Environment", IP.com No. IPCOM000240632D, Publication Date: Feb. 13, 2015, 9 pages.

Disclosed Anonymously, "Resource Usage Conflict Management Orchestrator", IP.com No. IPCOM000225239D, Publication Date: Feb. 1, 2013, 5 pages.

Lee et al., "An Active Resource Orchestration Framework for PAN-Scale Sensor-Rich Environments", Singapore Management University, 2014, 16 pages.

Nguyen et al., "Blueprinting Approach in Support of Cloud Computing", Future Internet, 2012, 25 pages.

* cited by examiner

AUTOMATIC GENERATION OF BLUEPRINTS FOR ORCHESTRATION ENGINES FROM DISCOVERED WORKLOAD REPRESENTATIONS

BACKGROUND

The present invention generally relates to deploying computer services, and more specifically, to the automatic generation of blueprints for orchestration engines from discovered workload representations.

The manual process of setting up a computing environment involves multiple steps such as obtaining the hardware, installing an operating system, connecting to and configuring a network, allocating storage, configuring security, deploying a database, connecting to a back-end system, and deploying an application. Orchestration tools have recently become available to automate portions of this process.

Cloud orchestration is the end-to-end automation of the deployment of services in a cloud environment. More specifically, it is the automated arrangement, coordination, and management of complex computer systems, middleware, and services in an attempt to accelerate the delivery of information technology (IT) services. Cloud orchestration can be used to manage cloud infrastructure, which supplies and assigns required cloud resources to customers, such as the creation of virtual machines (VMs), allocation of storage capacity, management of network resources, and granting access to cloud software. By using appropriate orchestration mechanisms, users can deploy and start using servers on any cloud platform.

Orchestration tools typically utilize a blueprint that represents a workload as input to deploying services for the workload. A blueprint is a declarative representation of the workload that is both human and machine readable. It describes the resources needed to support the workload as well as the properties of the resources. A blueprint allows solution architects to specify "here is what I want for this workload" without having to write a sequence of programming commands that instruct how to create the resources.

SUMMARY

According to one or more embodiments of the present invention, computer-implemented methods for the automatic generation of blueprints for orchestration engines from discovered workload representations are provided. A non-limiting example computer-implemented method includes receiving, using a processor, a description of a workload executing in a source computing environment. The description of the workload is mapped, using the processor, to one or more resource descriptors located in a repository of resource descriptors describing resources available in a target computing environment. A declarative representation of the workload in the target computing environment is generated, using the processor, based at least in part on the mapping and the description of the workload. The declarative representation includes a specification of resources required by the workload in the target environment.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
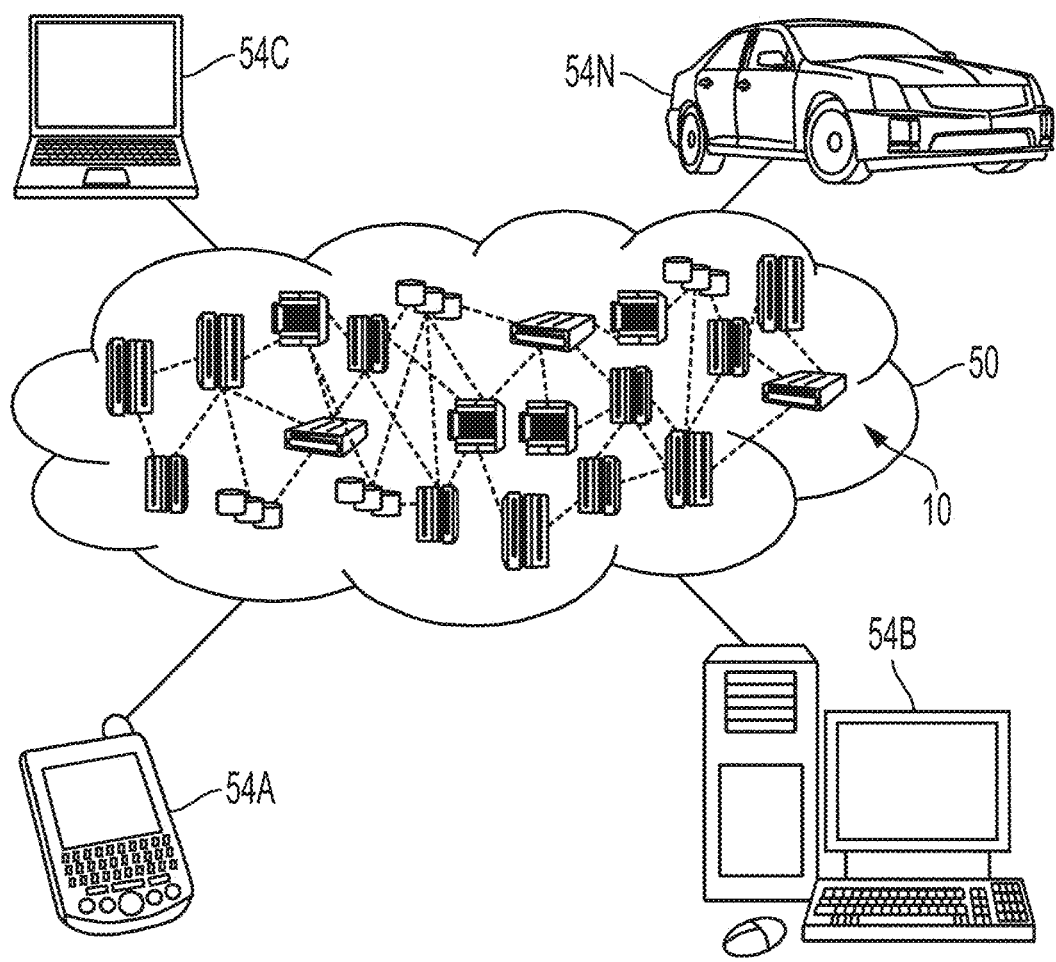
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention provide a transformation service that automatically generates blueprints for use by orchestration engines based at least in part on descriptive representations of discovered workloads. The blueprints are a declarative representation of the discovered workloads and are configured so that they may be input to orchestration engines for deploying services in a cloud environment. The transformation service may be used to assist in automating the process of migrating a workload from a legacy environment to a hybrid cloud environment by automating the build phase of the migration. The legacy environment may be a cloud environment or it may be an on-premises environment. Representing a legacy workload as a blueprint which includes codified, or declarative, representations of assets to be migrated allows the workload to be deployed consistently multiple times.

As used herein, the term "descriptive representation" refers to characteristics possessed by the discovered resource. This may be a free form textual representation or structured information that includes configuration, usage, and behavior data from machines, services, applications, middleware, etc. to better understand the workload. Different commercially available discovery services may have different descriptive representations.

As used herein, the term "declarative representation" refers to representing the workload as code, usually in text form that is machine and user readable so that it can be authored with any code editor and checked into a version control system. The discovery service finds resources (and properties of the resources) that are currently deployed and the transformation service converts this information into a format that can be accepted by an orchestration engine. Different commercially available orchestration engines may accept different blueprint formats. For example, Terraform by HashiCorp accepts Hashicorp Configuration Language (HCL), OpenStack Heat by OpenStack accepts a Heat Orchestration Template (HOT), Amazon Web Services by Amazon Web Services, Inc. uses CloudFormation Templates, and VMware vRealize® Automation™ uses packaged zip files. Each of these blueprints may in turn be specified with a domain specific language that may be represented as JavaScript Object Notation (JSON) or YAML or some proprietary format.

A declarative representation specifies the desired end state of a workload, and the orchestration engine itself is responsible for figuring out how to achieve that state. This is contrasted to a procedural representation where the user writes code that specifies, step-by-step, how to achieve some desired end state. In a procedural approach, each step for provisioning the workload must be explicitly written, while in a declarative approach only the end state is specified. The declarative representation (blueprint) abides by a general structure in which blueprint designers define structured providers and resources (and their properties) usually in JSON or YAML. As described previously, different orchestration engines have their own syntax for implementing this general structure. The orchestration engines validate the syntax of the inputted blueprint before executing it.

In accordance with one or more embodiments of the present invention a discovery service is provided that introspects a running workload and outputs a descriptive representation of the workload including, but not limited to the installed software and configuration data. The running, or executing, workload may be on a cloud based computing platform or an on-premises computing platform. The descriptive representation of the workload is used by the transformation service along with a repository of generic resource descriptors that can be included in blueprints to automatically generate one or more blueprints that represent the workload. The transformation service maps the descriptive representation of the workload to the generic resource descriptors to create one or more blueprints, or declarative representations of the workload. A blueprint is input to an orchestration engine for manipulating and composing resources for executing the workload in a target environment.

In accordance with one or more embodiments of the present invention, introspection may be performed using agent or agentless discovery and may include executing recognizer code for items in the repository of generic resource descriptors. These recognizers may return satisfiability values between zero percent and one-hundred percent. Zero percent indicates that there is no match with an item in the repository and one-hundred percent indicates a complete match with an item in the repository. This process may also involve executing multiple child recognizers and combining the results. One or more embodiments of the present invention find the items with maximum satisfiability value and maximum coverage of workload (in the environment). This may result in replacing legacy resources with compatible ones in the repository (e.g., newer versions) and combining the items into blueprints so that total satisfiability can be increased while minimize resources and/or maximizing coverage. This allows for providing blueprint recommendations with scores for top satisfiability values. This also allows recommending new resource definitions based on insufficient coverage of discovered entities One or more embodiments of the present invention provide a technological improvement over current workload migration techniques that are limited to automated discovery and reporting. Contemporary discovery service reports are manually interpreted by domain experts, such as information technology (IT) architects, to understand the dependency structure and properties of a workload executing on a source computing platform to change when the workload is deployed on a target computing platform. Scripts and custom code are manually authored by the domain experts to perform migration of the workload to the target computing platform. Thus, domain experts currently manually author a blueprint for the workload. Disadvantages of manually generating blueprints are that is often time-consuming, error prone, and requires vast domain knowledge of services, infrastructure, networking, etc. on the part of the domain expert in both the source and target environments. One or more embodiments of the present invention automate the process of generating blueprints to reduce the amount of manual effort required of domain experts. In addition, automating the generation of blueprints can eliminate, or greatly reduce, the number of errors encountered when the workload is deployed on the target computing environment. This can lead to improvements in system availability, as well as a decrease in the use of processor and human resources to detect and correct errors.

In addition, one or more embodiments of the present invention provide a technological improvement over current methods of generating blueprints without a consistent codified representation of the resources. A disadvantage of not having a consistent codified representation is that step by step execution steps needs to be specified by an author to get the required result. With declarative codified representation, the desired result is indicated without describing the steps to get to the desired result. An orchestration engine inputs the declarative codified representation and figures out how to obtain the result. Not having a consistent declarative representation can hinder reusability of workloads for multiple deployments (e.g., using the same workload for multiple clients), and therefore, it is difficult to automate the deployment of resources and services. Example embodiments of the present invention provide technical solutions to these disadvantages of existing solutions by providing a consistent codified representation of the resources. The codified representations are both human and machine readable, and thus the workloads and their provisioned instances can be deployed, searched, versioned, introspected, and updated. Consistent codified representations enable better testing and quality control, more efficient and predictable deployments, and decreased recovery times. In addition, they can provide improved testability and monitoring, lower the cost of experimentation and innovation, make deployments more predictable, and decreases the mean time to resolution for issues.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
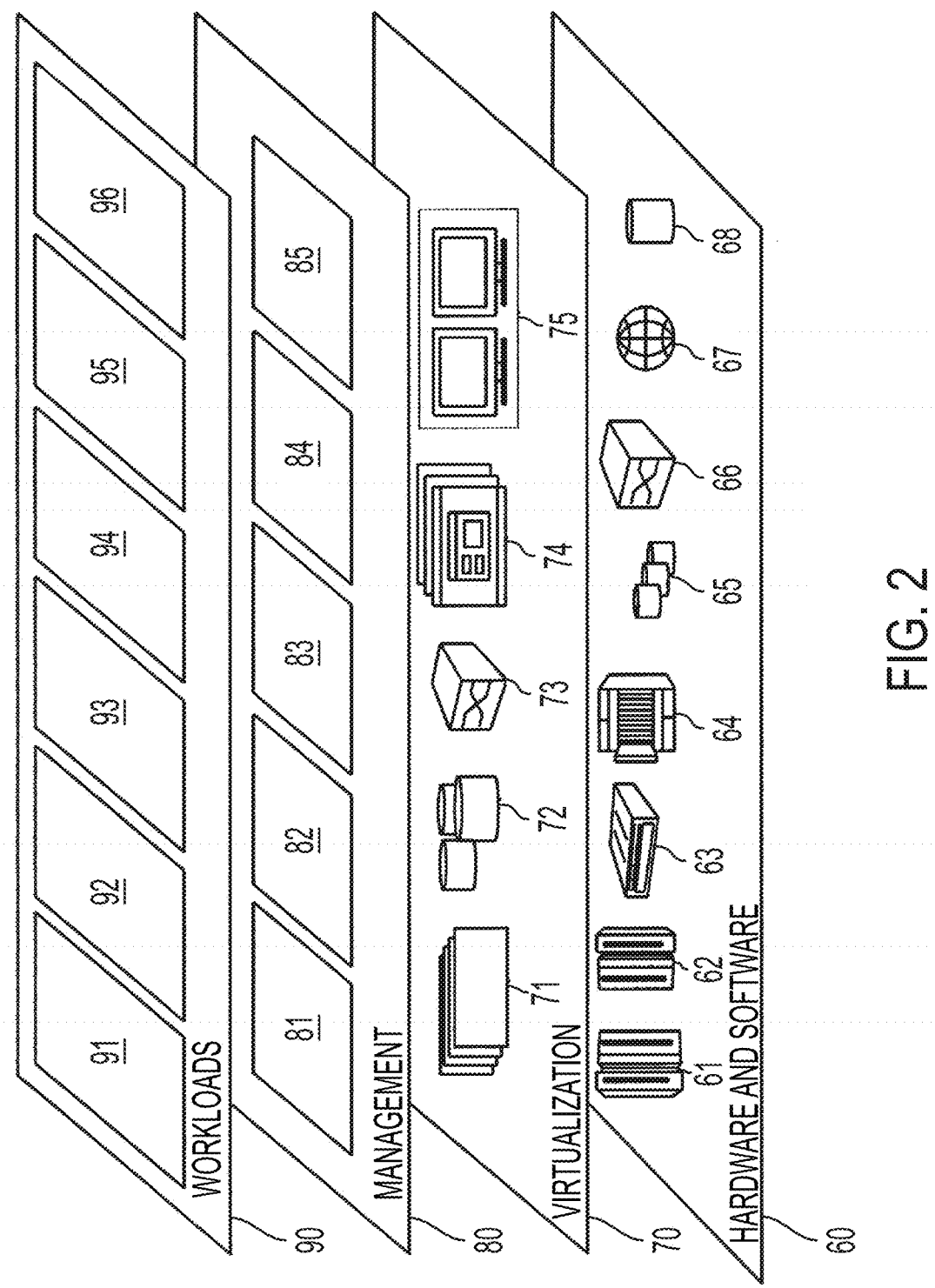
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic generation of blueprints from discovered workload representations 96.

Figure 3:
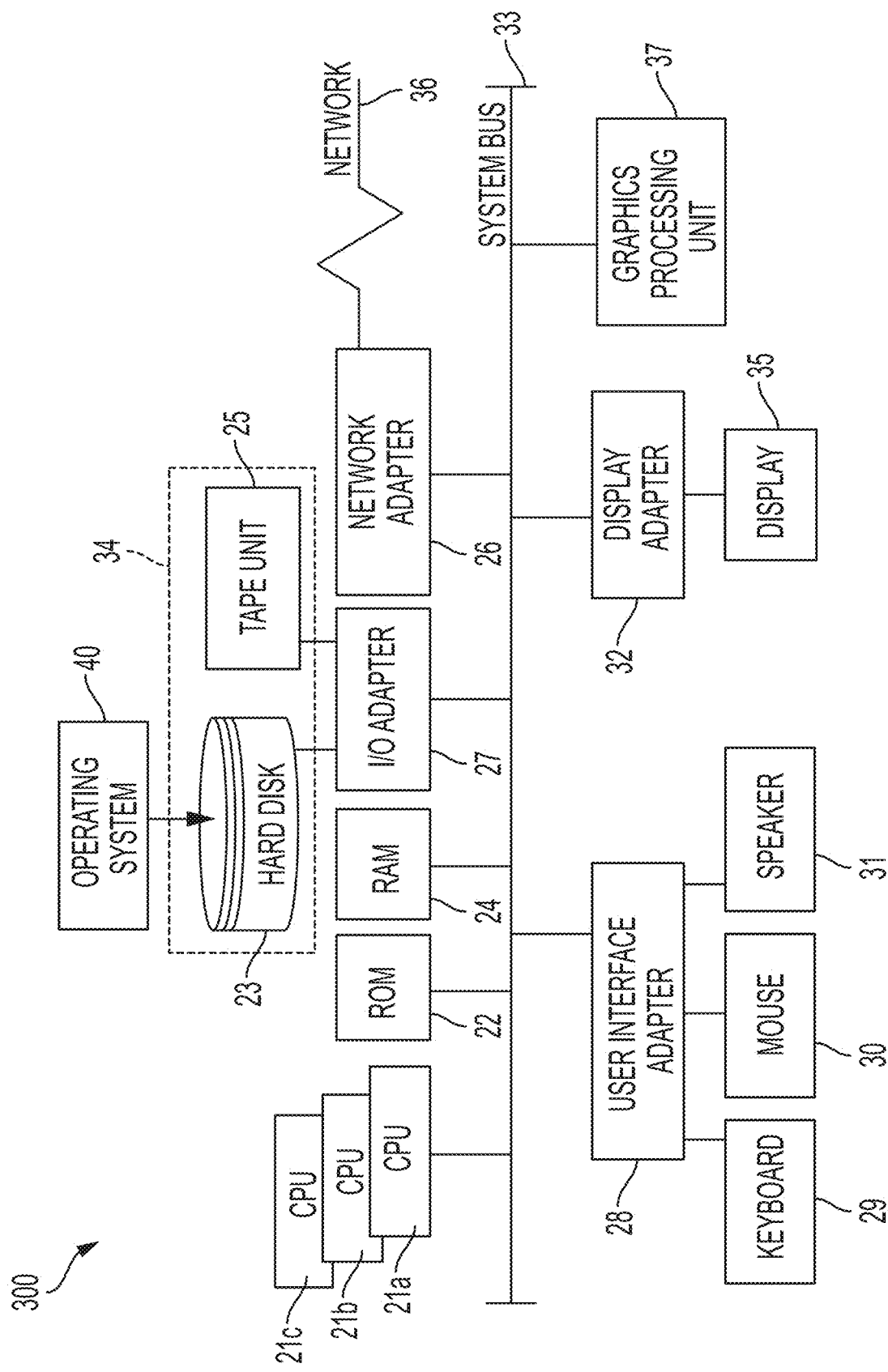
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
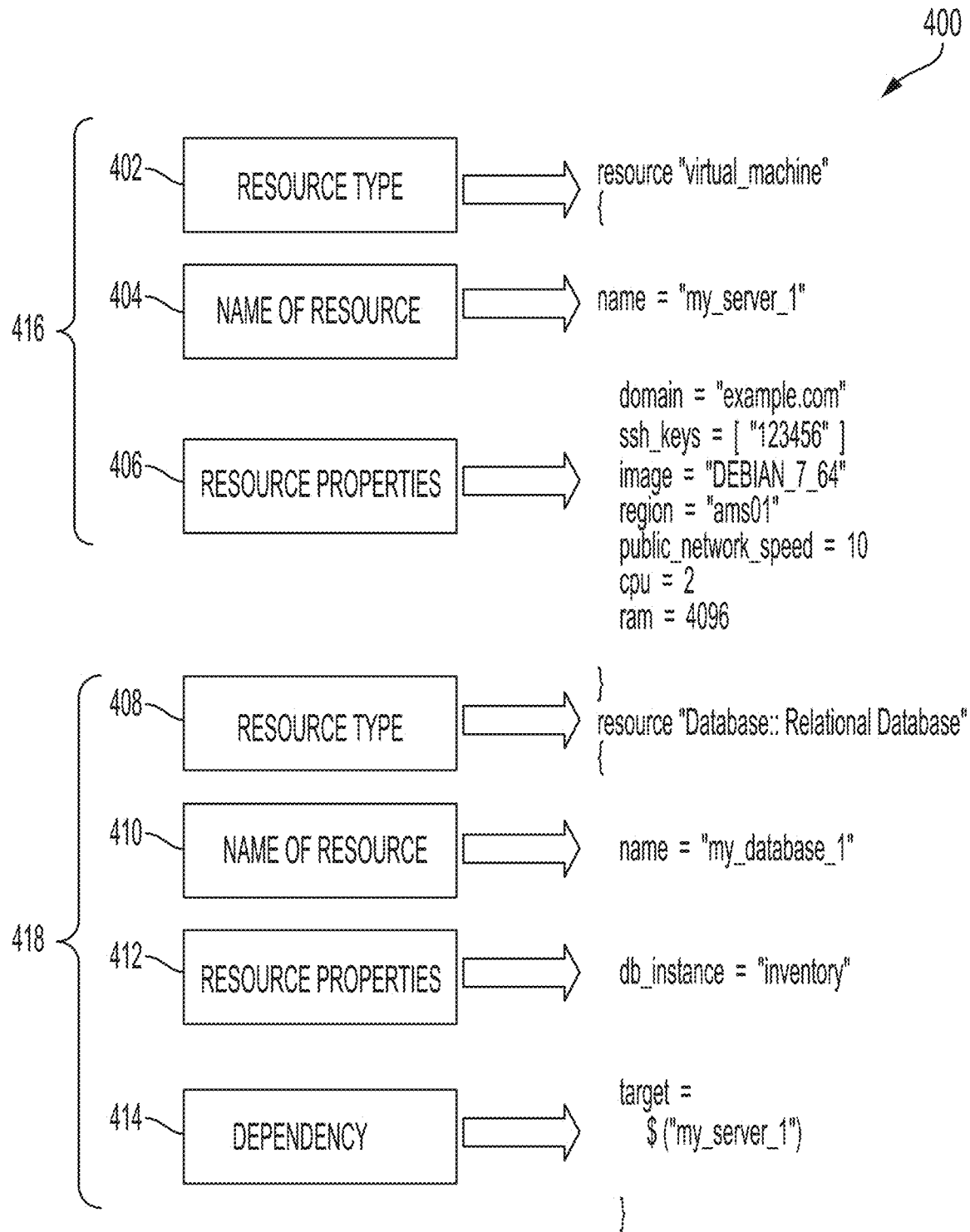
FIG. 4 an example blueprint of a workload according to one or more embodiments of the present invention.

Turning now to a more detailed description of aspects of the present invention, FIG. 4 depicts an example blueprint 400 of a workload for input to an orchestration engine in accordance with one or more embodiments of the present invention. As described previously, a blueprint is a declarative representation of a workload that is both human and machine readable. It describes exactly what resources will be created and their properties. Blueprints can define one or more resources to create, as well as relationships and dependencies between the resources specified in the blueprint. The example blueprint 400 shown in FIG. 4 is provided as an aid in describing aspects of embodiments of the present invention and is not intended to be limiting. One skilled in the art will recognize that a variety of other blueprint contents and format can also be implemented to perform the processing described herein.

The blueprint 400 shown in FIG. 4 includes a declarative representation of a first resource 416 having a resource type 402 of "virtual machine" and a name of resource 404 of "my_server_1." The resource properties 406 of the first resource 416 include domain; secure shell (SSH) key; image; region, public_network_speed; central processing unit (CPU); and random access memory (RAM). The domain property indicates the name with which to identify the VM. The SSH key is used for embedding the public key to enable access to the VM. The image property specifies the base image used to provision the virtual machine. The region property specifies the geographic area where the virtual machine should be instantiated. The public_network_speed property specifies a required network speed in the target environment, in this example ten Gbps. The CPU property specifies a required number of CPUs in the target environment, in this example two CPUs. The RAM property specifies a required amount of RAM in the target environment. In this example, the required amount of RAM is 4,096 megabytes.

The blueprint 400 shown in FIG. 4 also includes a declarative representation of a second resource 418 having a resource type 408 of "Database::Relational Database" and a name of resource 410 of "my_database_1." The resource properties 412 of the second resource 418 specify a db_instance of "inventory" to indicate that database name. The dependency 414 of the second resource 418 indicates that the target location of the second resource 418 is the first resource 416. This is an example of an explicit dependency between the first resource 416 and the second resource 418. In this example, a Relational Database instance (second resource 418) requires an association with a virtual machine (first resource 416), thereby creating a dependency for the Relational Database service. Dependencies can be implicitly inferred from a blueprint or explicitly defined in a blueprint by a user. The use of explicit dependencies between resources ensures that they are created in the correct order and each one is uniquely named within the blueprint.

Each named resource in a blueprint can have its property values explicitly set to a value, or they can be implicitly set via a reference to a property from a different named resource in the blueprint or implicitly set via a reference to an input parameter to the blueprint.

Blueprints can also be nested, which allows the decomposition of deployment into a set of targeted, purpose-specific blueprints. Decomposition provides benefits in terms of readability, reuse and testing. Parameters can be passed from a main blueprint to nested blueprints. The nested blueprint can pass an output variable back to the main source blueprint, which enables data exchange between blueprints.

The blueprint is a reusable asset for repeated use. It can be reused across customers and can be repeatedly used in a consistent manner by an orchestration engine. A blueprint can be exported as a readable text file such as, but not limited to YAML, JSON, and HCL.

Figure 5:
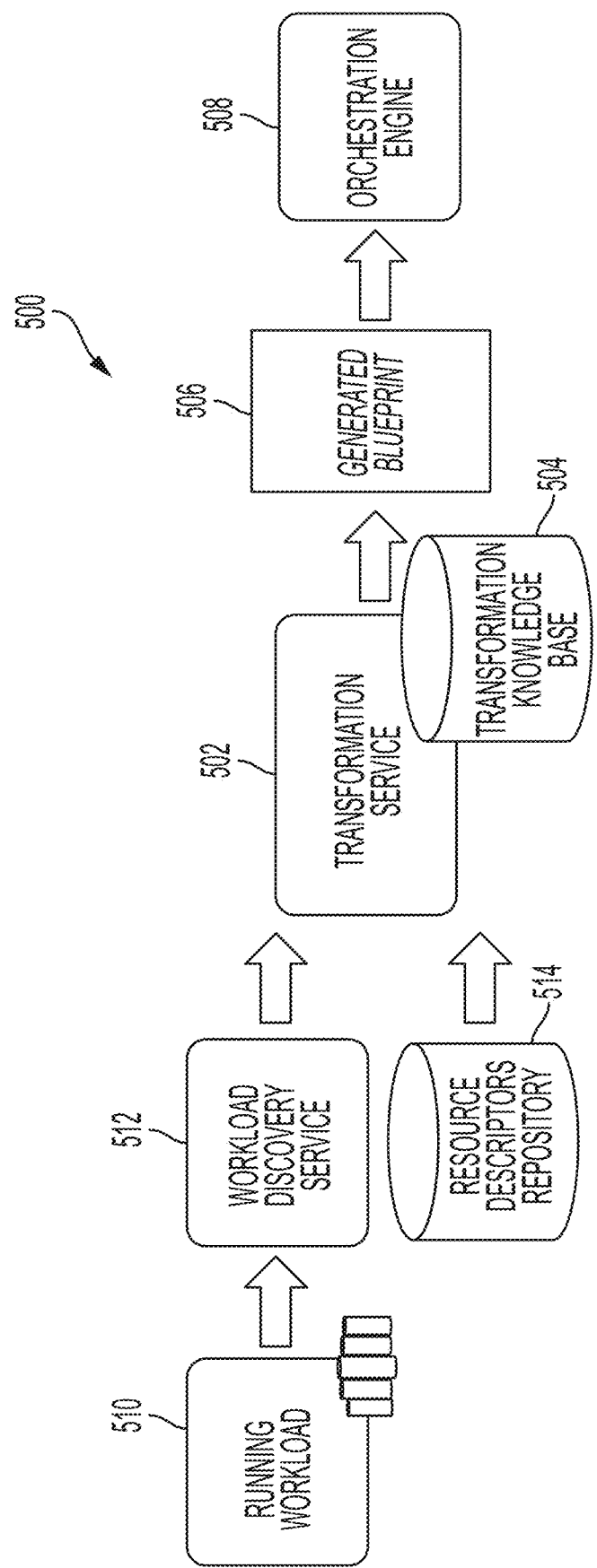
FIG. 5 depicts a block diagram of a system for automatically generating blueprints from discovered workload representations according to one or more embodiments of the present invention.

FIG. 5 depicts a block diagram of a system 500 for automatically generating blueprints from discovered workload representations in accordance with one or more embodiments of the present invention. All or a subset of the system 500 shown in FIG. 5 may be implemented by one or more cloud computing nodes 10 and local computing devices 54A-N of FIG. 1. The cloud computing environment may be a hybrid cloud, a public cloud, or a private cloud. The system 500 in FIG. 5 includes a running workload 510 in a source computing environment, a workload discovery service 512, a resource descriptors repository 514, a transformation service 502, a transformation knowledge base 504, a generated blueprint 506, and an orchestration engine 508. The running workload 510 may be located in a cloud environment, such as the one described above with reference to FIGS. 1 and 2, or it may be located in an on-premises environment. As used herein, the term "on-premises" refers to a workload that is installed and executed on computers on the premises (e.g., in the building) of the person or organization using software that is part of the workload, rather than at a remote facility such as a server farm or cloud.

As shown in FIG. 5, a workload discovery service 512 gathers information about the running workload. In accordance with one or more embodiments of the present invention IT infrastructure and application discovery services may be used to gather information about running infrastructure, software, and applications in existing environments. Examples of commercially available discovery services that may be utilized include, but are not limited to Application Discovery Service by Amazon Web Services, Inc., ServiceNow® Discovery, and IBM® Tivoli Application Dependency Discovery Manager. The discovery services can use agent or agent-less methods. The gathered information is utilized to establish a descriptive representation of the inventory including the connections/dependencies between components.

Also shown in FIG. 5 is a resource descriptors repository 514 that stores generic resource descriptors that may be included, or used, in blueprints generated by the transformation service 502. In an embodiment, the generic resource descriptors are input by a user that has domain expertise that included knowledge about services/resources in the target computing environment(s). In addition, or alternatively, the generic resource descriptors are automatically generated based on electronically stored information about the target computing environment. In addition, or alternatively, the generic resource descriptors are inputted by an application or a software program, In accordance with one or more embodiments of the present invention, if the transformation service 502 is unable to find a resource in the catalog that matches one or more entities in the workload, the system will provide a detailed specification of the missing resource with engine-specific recommendation for its implementation.

In an embodiment, each generic resource descriptor includes a type (which is the name of the resource) and a representation of its associated properties (a schema) and available actions. Resources are components of the infrastructure and managed services, and may include a low level component such as but not limited to a physical server, virtual machine, or container; or a higher level component such as, but not limited to an email provider, a backup service, DNS record, and database provider. The resources that are discovered and/or used in blueprints may include, but are not limited to: infrastructure, middleware, software, APIs, managed services, networking, applications, and data. An example of a generic resource descriptor for VMware vSphere Virtual Machine by VMware, Inc. stored in the resource descriptors repository 514 follows:

VSphereVirtualMachine{
Schema{
"resource_pool_id": {Type: schema.TypeString,
Description: "The ID of a resource pool to put the virtual machine in.",
},
"datastore_id": {Type: schema.TypeString,
Description: "The ID of the virtual machine's datastore. The virtual machine configuration is placed here, along with any virtual disks that are created without datastores",
},
"datastore_cluster_id": {Type: schema.TypeString,
Description: "The ID of a datastore cluster to put the virtual machine in."
},
"folder": {Type: schema.TypeString, Description: "The name of the folder to locate the virtual machine in."
},
"host_system_id": {Type: schema.TypeString,
Description: "The ID of an optional host system to pin the virtual machine to.",
},
"scsi_type": {Type: schema.TypeString,
Description: "The type of SCSI bus this virtual machine will have. Can be one of lsilogic, lsilogic-sas or pvscsi.",
}
"disk": {Type: schema.TypeList,
Description: "A specification for a virtual disk device on this virtual machine.",
MaxItems: 60,
Elem: &schema.Resource{Schema: rtualdevice.DiskSubresourceSchema( )},
},
"network_interface": {Type: schema.TypeList,
Description: "A specification for a virtual NIC on this virtual machine.",
MaxItems: 10,
Elem: &schema.Resource{Schema: virtualdevice.NetworkInterfaceSubresourceSchema( )},
},
"cdrom": {Type: schema.TypeList,
Description: "A specification for a CDROM device on this virtual machine.",
MaxItems: 1,
Elem: &schema.Resource{Schema: virtualdevice.CdromSubresourceSchema( )},
},
"vmware_tools_status": {
Type: schema.TypeString,
Description: "The state of VMware tools in the guest. This will determine the proper course of action for some device operations.",
},
"vmx_path": {Type: schema.TypeString,
Description: "The path of the virtual machine's configuration file in the VM's datastore.",
},
"moid": &schema.Schema{Type: schema.TypeString,
Description: "The machine object ID from VMWare",
},
vSphereTagAttributeKey: tagsSchema( ),
}
Actions {
  Create: resourceVSphereVirtualMachineCreate( ),
  Read: resourceVSphereVirtualMachineRead( ),
  Update: resourceVSphereVirtualMachineUpdate( ),
  Delete: resourceVSphereVirtualMachineDelete( ),
}
}

The example generic resource descriptor shown above is provided as an aid in describing aspects of embodiments of the present invention and is not intended to be limiting. One skilled in the art will recognize that a variety of other generic resource descriptor contents and format can also be implemented to perform the processing described herein.

The transformation service 502 matches, or maps, resource descriptors found in the descriptive representation of the workload output by the workload discovery service 512 to the generic resource descriptors located in the resource descriptors repository 514. In an embodiment, the mapping is performed using text analytics and/or natural language processing as well as transformation rules in the transformation knowledge base 504. Once the resources have been mapped to generic resource descriptors, the transformation knowledge base 504 is used by the transformation service 502 to create one or more generated blueprints 506. The mappings may also specify the translations and assignments of the properties for the entities in the resource descriptor repository 514. In one or more embodiments of the present invention, the transformation knowledge base 504 also stores information about previous transformations so as to improve and provide recommendations for future transformations based on, but not limited to: similarity, historical performance, cost, user specification, compliance, support level, and availability. Previous dependency structures of resources may be stored as well in the transformation knowledge base 504. The transformation knowledge base 504 may be populated automatically based on electronically stored information and/or by a domain expert using a user interface.

For example, a Windows® "systeminfo" command may be called by a discovery service to obtain system information for a Microsoft® Windows computer and output the following information, or descriptive representation:
  OS Build Type: Multiprocessor Free
  Product ID: 55041-009-6540794-86210
  System Manufacturer: LENOVO
  System Model: 20EGSOR900
  System Type: x64-based PC
  Processor(s): 1 Processor(s) Installed.
  [01]: Intel64 Family 6 Model 60 Stepping 3 GenuineIntel ~2801 Mhz
  BIOS Version: LENOVO GNET79WW (2.27), Mar. 16, 2016
  Boot Device: \Device\HarddiskVolume1
  System Locale: en-us;English (United States)
  Input Locale: en-us;English (United States)
  Time Zone: (UTC-05:00) Eastern Time (US & Canada)
  Total Physical Memory: 32,393 MB
  Network Card(s): 1 NIC(s) Installed.
  [01]: Intel® Ethernet Connection I217-LM
  Connection Name: Local Area Connection
  DHCP Enabled: Yes
  DHCP Server: 9.2.250.21
  IP address(es)
  [01]: 9.2.226.109

In accordance with one or more embodiment of the present invention, this can be transformed to a Windows 10 Virtual Machine resource descriptor through an embodiment of the transformation service 502 described herein. In an embodiment, the transformation knowledge base 504 has an entry that states that this descriptive representation can be transformed to a Windows 10 VM resource (resource type→resource descriptor). The transformation knowledge base 504 can also have subentries that describe which properties are used by the generic resource descriptor (e.g., "IP address(es)" maps to IP address in the generic resource descriptor, and "Total Physical Memory" maps to RAM in the resource descriptor). The example descriptive representation and mapping shown above is provided as an aid in describing aspects of embodiments of the present invention and is not intended to be limiting as one skilled in the art will recognize that other descriptive representations and/or mapping may be implemented by embodiments of the present invention.

As shown in the system 500 of FIG. 5, the transformation service 502 outputs one or more generated blueprints 506 based at least in part on the output from the workload discovery service 512, the contents of the resource descriptors repository 514, and contents of the transformation knowledge base 504. The transformation of resources within a workload may result in an expansion into one or more resources to match the resources within the resource descriptors repository 514. For example, a VM image resource with a database and a webserver may be expanded into three separate resources including a VM, a database, and a web server. In addition, the transformation service 502 may consolidate resources within a workload into one or more resources to match the resources in the resource descriptor repository.

Properties of the discovered resources, such as resource properties 406 and 412 of FIG. 4, may be labelled by the transformation service 502 as dynamic (may change for another workload instance) or static (should not change for another workload instance) based at least in part on criteria such as, but not limited to: resource context, labels within the resource descriptor repository 514, user specification, historical performance, and threshold. In accordance with one more embodiments of the present invention, discovered properties such as, but not limited to: keys, usernames, and passwords, will be labeled as dynamic since these values will likely be changed in subsequent blueprint executions. In addition, discovered properties such as, but not limited to: configuration parameters, software, and application programming interfaces (APIs), may be labeled as static since these values will not change in subsequent blueprint executions. Other properties such as, but not limited to: Internet protocol (IP) addresses, ports, subnets, and virtual private networks (VPNs) can be inferred from other resources/providers in the blueprint (implicit dependencies).

In accordance with one or more embodiments of the present invention, the transformation service 502 may convert from one mapped resource to a different resource in the resource descriptor repository 504 based on criteria such as, but not limited to: similarity, historical performance, cost, user specification, compliance, support level, and availability. For example, an Amazon® virtual machine (VM) resource may be exchanged for an IBM SoftLayer® VM resource if these components are interchangeable. As another example, a customer's deployment of WebSphere® by IBM may no longer be in support and may be updated to a newer version during the transformation.

The transformation service 502 may also choose to exclude resources based on criteria such as, but not limited to: historical performance, cost, user specification, compliance, versioning, deprecation, support availability, and resource availability. In addition, the transformation service 502 may choose and recommend resource(s) to use if the transformation of resources results in multiple possible resources for a single entity in the workload based on criteria such as, but not limited to: historical performance, cost, user specification, compliance, versioning, deprecation, and support availability. For example, the transformation service 502 may discover a database resource that can be mapped to multiple options such as MongoDB® by MongoDB, Inc., MySQL® by Oracle Corporation, and DB2® by IBM, if these components are interchangeable.

In accordance with one or more embodiments of the present invention, in cases where multiple resources match a single entity in the workload, the transformation service 502 may rank the choices based on closeness to the entity in the workload and requirements specified by a user. For example, if the entity in the workload is DB2, the DB2 resource will be ranked higher than a MySQL resource which will in term have a higher rank than a MongoDB resource. On the other hand, if the user specifies that they would like to minimize cost, a MySQL resource may have a higher rank. Similarly, the user (e.g., in a user specification) may in turn assign different weights to his or her preferences. The ranking could also be influenced by other factors such as, but not limited to: historical performance, cost, compliance, versioning, depreciation, and support availability.

In accordance with one or more embodiments of the present invention, if the transformation service 502 is unable to find a resource in the resource descriptors repository 514 that matches one or more entities in the workload, the system will provide a detailed specification of the missing service with an engine-specific recommendation for its implementation. For example, if the workload includes a remediation of security issues step, but such a service isn't found, the method may return a partial blueprint with a placeholder for the missing component and a description of the required operations and specifications.

The authoring of a blueprint, such as generated blueprint 506, by the transformation service 502 may include identifying a dependency structure among the mapped resources. For example, if the workload discovery service 512 locates a workload with a Web server having a MySQL database, the transformation service 502 may understand this context and automatically add a dependency in the blueprint, requiring the MySQL database to be created before the Web server is configured (thereby avoiding a potential error). In accordance with one or embodiments of the present invention, dependencies are stored in the transformation knowledge base 504.

As shown in the system 500 of FIG. 5, the generated blueprint 506 is output by the transformation service 502 and then input to an orchestration engine 508. The orchestration engine 508, which is implemented using a commercially available orchestration engine, automatically determines the execution plan and the order in which to instantiate the resources in the generated blueprint 506. The orchestration engine 508 interprets the generated blueprint 506 and automatically determines what resources within the generated blueprint 506 are dependent on each other; these dependencies are referred to as implicit dependencies. As described previously, the transformation service 502 may also specify dependencies among resources directly in the generated blueprint 506; these dependencies are referred to as explicit dependencies. Based at least in part on the resource dependencies, the orchestration engine 508 automatically establishes the optimal execution paths. It is important to note that the transformation service 502 as the author of the generated blueprint 506 only focuses on declaring what resources are required and the orchestration engine 508 takes care of the how those resources are instantiated in the target computing environment.

Figure 6:
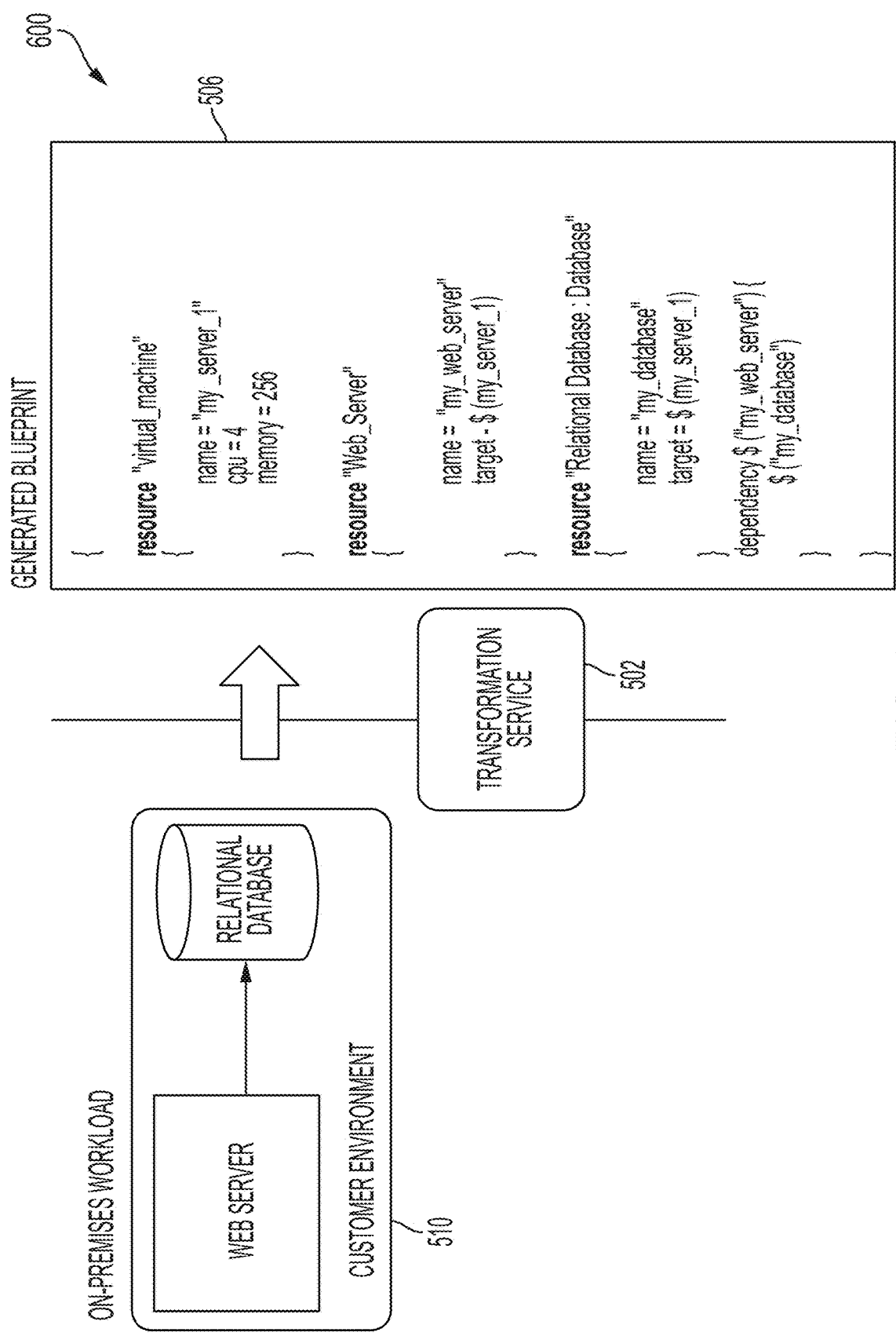
FIG. 6 depicts a block diagram of transforming a discovered workload representation into a generated blueprint definition according to one or more embodiments of the present invention.

Turning now to FIG. 6, a block diagram 600 of a high level process of transforming a running workload at a customer environment 510 into generated blueprint 506 using transformation service 502 is generally shown in accordance with one or more embodiments of the present invention. The example shown in FIG. 6 is provided as an aid in describing aspects of embodiments of the present invention and is not intended to be limiting.

Figure 7:
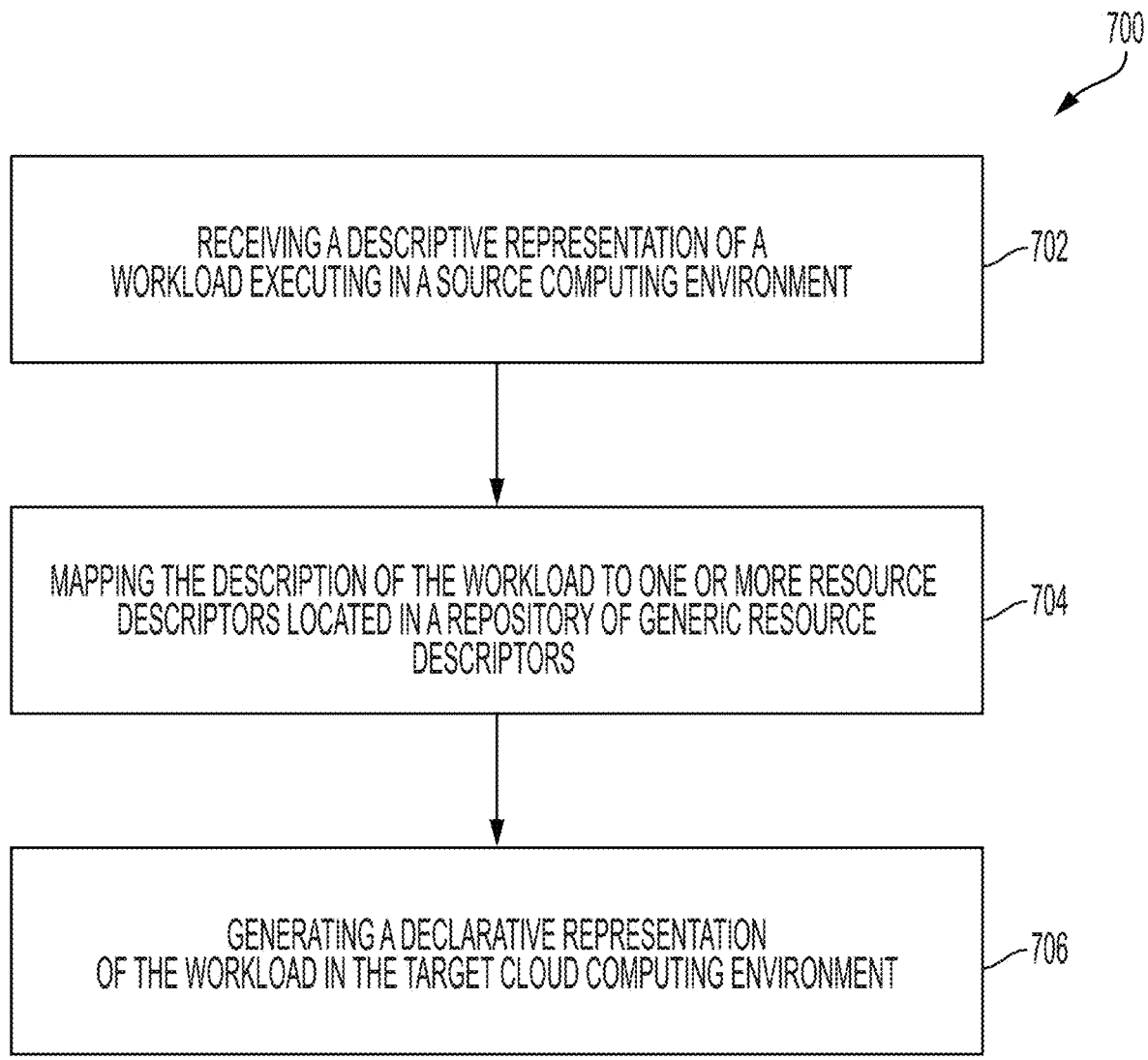
FIG. 7 depicts a flow diagram of a process for automatically generating blueprints from discovered workload representations according to one or more embodiments of the present invention.

Turning now to FIG. 7, a flow diagram 700 of a process for automatically generating blueprints from discovered workload representations is generally shown in accordance with one or more embodiments of the present invention. All or a subset of the processing shown in FIG. 7 may be implemented by computer instructions for implementing a transformation service, such transformation service 502 of FIG. 5, executing on one or more cloud computing nodes 10 and local computing devices 54A-N of FIG. 1.

At block 702 of FIG. 7, a description of a workload (also referred to herein as a "descriptive representation of a workload") executing in a source computing environment is received at the transformation service. The source computing environment may be an on-premises computing environment and/or a cloud computing environment. A source cloud computing environment may include, but is not limited to a hybrid cloud, a public cloud, and/or a private cloud.

At block 704 of FIG. 7, the transformation service maps the description of the workload to one or more resource descriptors located in a repository of resource descriptors, such as resource descriptor repository 514 of FIG. 5, describing resources available in a target cloud computing environment. The types of resources may include, but are not limited to: an infrastructure resource, a middleware resource, a software resource, an application programming interface resource, a managed service, a networking resource, an application, and data.

At block 706 of FIG. 7, the transformation service generates a declarative representation of the workload, such as generated blueprint 506, of the workload in the target cloud computing environment. In accordance with one or more embodiments of the present invention, the declarative representation includes a specification of resources required by the workload in the target environment. The generating may be based at least in part on the mapping and on the descriptive representation of the workload. In accordance with one or more embodiments of the present invention multiple declarative representations are generated. The declarative representation of the workload may also include dependencies among the resources. The target cloud computing environment may include, but is not limited to a hybrid cloud, a public cloud, and/or a private cloud.

The process shown in FIG. 7 may also include automatically deploying the workload in the target cloud environment based at least in part on the declarative representation of the workload. The deploying may be performed by an orchestration engine, such as orchestration engine 508 of FIG. 5, based at least in part on the declarative representation of the workload.

The processing shown in FIG. 7 may also include executing a discovery service, such as workload discovery service 512 of FIG. 5 that introspects the workload executing in the source computing environment and outputs the description of the workload to the transformation service.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems.

In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, using a processor, a description of a workload executing in a source computing environment, the description comprising a resource type, a resource identifier, and one or more resource properties;
   mapping, using the processor, the description of the workload to one or more resource descriptors located in a repository of resource descriptors describing resources available in a target computing environment; and
   generating, using the processor, based at least in part on the mapping and the description of the workload, a declarative representation of the workload in the target computing environment, the declarative representation including a specification of resources required by the workload in the target environment.

2. The computer-implemented method of claim 1, wherein the target computing environment is a cloud computing environment.

3. The computer-implemented method of claim 1, further comprising automatically deploying, using the processor, the workload in the target environment based at least in part on the declarative representation of the workload.

4. The computer-implemented method of claim 3, wherein the deploying is performed by an orchestration engine based at least in part on the declarative representation of the workload.

5. The computer-implemented method of claim 1 further comprising executing a discovery service that introspects the workload executing in the source computing environment and outputs the description of the workload.

6. The computer-implemented method of claim 1, wherein the source computing environment is an on-premises computing environment.

7. The computer-implemented method of claim 1, wherein the source computing environment is a cloud computing environment.

8. The computer-implemented method of claim 1, wherein multiple declarative representations are generated based at least in part on the mapping and the description of the workload.

9. The computer-implemented method of claim 1, wherein at least a subset of the resources are selected from the group consisting of an infrastructure resource, a middleware resource, a software resource, an application programming interface resource, a managed service, a networking resource, an application, and data.

10. The computer-implemented method of claim 1, wherein the declarative representation of the workload further includes dependencies among the resources.

11. A system comprising:
    a memory having computer readable instructions; and
    one or more processors for executing the computer readable instructions, the computer readable instructions controlling the one or more processors to perform operations comprising:
      receiving a description of a workload executing in a source computing environment, the description comprising a resource type, a resource identifier, and one or more resource properties;
      mapping the description of the workload to one or more resource descriptors located in a repository of resource descriptors describing resources available in a target computing environment; and
      generating based at least in part on the mapping and the description of the workload, a declarative representation of the workload in the target computing environment, the declarative representation including a specification of resources required by the workload in the target computing environment.

12. The system of claim 11, wherein the target computing environment is a cloud computing environment.

13. The system of claim 11, wherein the operations further comprise automatically deploying, using the processor, the workload in the target environment based at least in part on the declarative representation of the workload.

14. The system of claim 13, wherein the deploying is performed by an orchestration engine based at least in part on the declarative representation of the workload.

15. The system of claim 11, wherein the operations further comprise executing a discovery service that introspects the workload executing in the source computing environment and outputs the description of the workload.

16. The system of claim 11, wherein the declarative representation of the workload further includes dependencies among the resources.

17. A computer program product comprising a computer readable storage medium having program instructions embodied therewith, the program instructions executable by a processor to cause the processor to perform operations comprising:

receiving a description of a workload executing in a source computing environment, the description comprising a resource type, a resource identifier, and one or more resource properties;

mapping the description of the workload to one or more resource descriptors located in a repository of resource descriptors describing resources available in a target computing environment; and generating based at least in part on the mapping and the description of the workload, a declarative representation of the workload in the target computing environment, the declarative representation including a specification of resources required by the workload in the target environment.

18. The computer program product of claim 17, wherein the target computing environment is a cloud computing environment.

19. The computer program product of claim 17, wherein the operations further comprise automatically deploying, using the processor, the workload in the target environment based at least in part on the declarative representation of the workload.

20. The computer program product of claim 19, wherein the deploying is performed by an orchestration engine based at least in part on the declarative representation of the workload.

\* \* \* \* \*